Nov. 19, 1935.  A. K. MALMQUIST  2,021,665
METHOD OF CANNING
Filed May 25, 1935

Inventor
A. K. Malmquist
By Seymour & Bright
Attorneys

Patented Nov. 19, 1935

2,021,665

UNITED STATES PATENT OFFICE 2,021,665

METHOD OF CANNING

Adolph K. Malmquist, Bellingham, Wash.

Application May 25, 1935, Serial No. 23,515

7 Claims. (Cl. 99—8)

This invention relates to an improved method of canning fruit and more particularly to a method of canning apples or pears in such manner that they are maintained in substantially fresh condition and may be used not only for pies and the like but for cakes, salads, desserts, etc.

In canning apples, it has been customary heretofore for the packers to cut apples one day and pack them in tanks or barrels filled with brine. The next day, after the apples have remained in the brine for a great number of hours, they are removed and subjected to a heating process to work the salt out, and then the apples are canned. As a result of such treatment, the apples acquire a salty flavor and they are quite dissimilar to fresh apples.

The object of the present invention is to can apples or the like by a continuous method which is of materially shorter duration than the methods heretofore employed and by which the apples retain substantially their original flavor.

Another object is to obtain a high grade pack, very close to fresh apples.

A further object is to can apples or other fruit in such a way that the contents of each can may be readily inspected up to the time of sealing, so that the operator may determine if the fruit has been properly vacuumized, covered with syrup, etc.

A still further object is to provide a method for canning fruit in which the fruit is kept at a relatively low temperature, say below 120° F., up to and including the sealing of the cans; the temperature being elevated to a cooking temperature only after the cans have been sealed.

With the foregoing objects outlined and with other objects in view which will appear as the description proceeds, the invention consists in the novel features hereinafter described in detail, illustrated in the accompanying drawing, and more particularly pointed out in the appended claims.

Before giving a detail description of the present invention, it will be noted that the present application is a continuation-in-part of my application Serial No. 715,958, dated March 16, 1934. In accordance with the present invention, if my improved method is used for preserving fresh apples, they are processed in the following way. First, the apples are peeled and their cores are removed. Then, they are trimmed into cylindrical shape to an outside diameter suitable to fit in the cans 7 and afterwards they are cut into slices 8 of any preferred thickness. Then the pieces may be placed in wire baskets or the like and the pieces plunged into or submerged in running salt water to prevent subsequent oxidation. This water is preferably an aqueous five to twenty per cent salt solution and the pieces are kept in this water for a period of about one to two minutes but not over five minutes. During this step of the process, the pieces of apple may be contained in wire baskets which are fed through the water by an endless conveyer or the like.

Immediately after removing the apples from the salt water bath they are plunged into running fresh water which may be kept luke warm. The apples may be moved through the fresh water while they are contained in wire baskets transported by an endless conveyer, and they are kept in the water for a period of about one to two minutes and not over five minutes. The fresh water removes salt, washes off small bits which may be left uncut, softens the apples and helps to open the pores.

Figure 1:
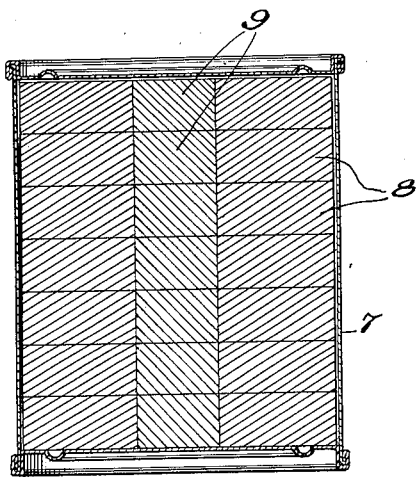
Fig. 1 is a vertical sectional view of a can filled with plugged apple slices canned in accordance with my invention.
Figure 2:
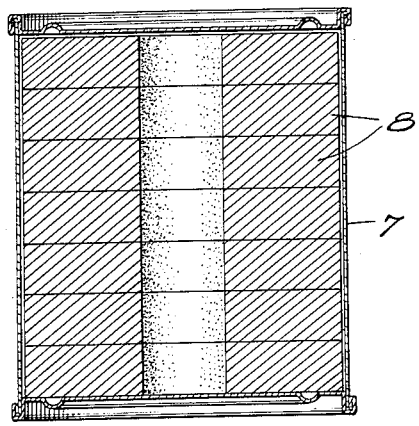
Fig. 2 is a similar view but with the plugs omitted.
Figure 3:
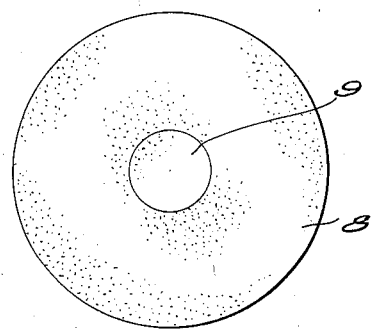
Fig. 3 is a plan view of one of the apple slices with a plug in place.
Figure 4:
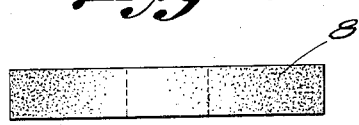
Fig. 4 is an edge view of such a slice with the plug omitted.
Figure 5:
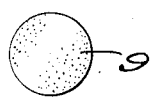
Figs. 5 and 6 are a top plan and side elevation respectively, of one of the plugs.
Figure 6:

When the apples are removed from the fresh water, they are immediately piled into cans as indicated in Figs. 1 and 2, and the filled cans are pre-vacuumized at a high vacuum of about 27 to 28 inches for a time sufficient to remove excess moisture and open the small pores of the slices. This may be accomplished by applying vacuum to the cans while they are turned upside-down, so that gravity will assist in draining excess moisture from the apples. Of course, suitable means must be employed to prevent the apples from falling out of the cans while the latter are upsidedown.

After pre-vacuumizing, the cans are conveyed to filling machines and the remaining space within them is substantially filled with a suitable simple syrup which, of course, enters the open pores of the fruit. Then the completely filled cans are transferred to a vacuum sealing machine and sealed under vacuum, but prior to the sealing the temperature of the fruit is kept relatively low, say below 120° F., as I have found that the condition of the fruit is improved if they are not placed under a high temperature until after the cans are sealed. It will therefore be understood that the apples are maintained at a relatively low temperature from the time they are peeled and cored until they are sealed in the cans.

After the sealing, the cans are subjected to heat treatment for the purpose of cooking the apples and this may be accomplished by treating the cans at a temperature of about 212° F. for a period of not more than ten minutes. If higher temperatures are employed, of course, the cooking time may be considerably less than ten minutes.

Finally, immediately after the cooking operation, the cans and their contents are rapidly cooled in any suitable way, as I have found that fruit rapidly cooled after the cooking operation has a better flavor than if the cans are permitted to cool slowly due to atmospheric conditions.

While the foregoing procedure is especially advantageous for the treatment of apples, the same treatment may be employed for pears, but the pears may be cut into halves instead of being sliced, and the salt solution into which the fruit is originally plunged should not be as strong as that used for apples.

In order to utilize maximum space within the cans for the storage of apples, the aperture formed in each slice during the coring operation may be filled with a plug 9 which may be made from end slices of the apples.

While I prefer in packing apples to pack them in slices as above outlined, it is manifest, in accordance with my invention, that the apples may be cut into various shapes, such as slices of disc shape, cubes, quarters, eighths, etc.

The cans after pre-vacuumizing and before syruping as well as after syruping and before sealing, may be exposed to the atmosphere and therefore it will be understood that the operator may observe the condition of the fruit and satisfy himself that all operations are conducted properly.

While I have disclosed specifically the treatment of apples and pears, I am aware that my process without material change, may be employed in the treatment of other fruits, vegetables and edible plants, and I therefore desire it be understood that in treating such materials changes may be made in the details of the method disclosed herein without departing from the spirit of the invention as expressed in the claims.

What I claim and desire to secure by Letters Patent is:

1. A continuous method of canning fruit in such manner that it is maintained in substantially fresh condition comprising subjecting the fruit to the following steps in the order named: first, immerse the fruit for a period of about one to two minutes in salt water to prevent oxidation; second, wash the fruit with fresh water for a period of about one to two minutes to remove salt and help open the pores of the fruit; third, place the fruit in a can and subject the same therein to pre-vacuumizing at a high vacuum of about 27 or 28 inches for a time sufficient to withdraw excess moisture from the fruit and open the small pores of the fruit; fourth, introduce simple syrup into the can to substantially fill the space unoccupied by the fruit; fifth, seal the filled can under vacuum conditions; and sixth, subject the can and its contents to a sufficient temperature for a period of time sufficient to slightly cook said contents.

2. A continuous method of canning fruit in such manner that it is maintained in substantially fresh condition comprising subjecting the fruit to the following steps in the order named: first, immerse the fruit for a period of about one to two minutes in salt water to prevent oxidation; second, wash the fruit with fresh water for a period of about one to two minutes to remove salt and help open the pores of the fruit; third, place the fruit in a can and subject the same therein to pre-vacuumizing at a high vacuum of about 27 or 28 inches for a time sufficient to withdraw excess moisture from the fruit and open the small pores of the fruit; fourth, introduce simple syrup into the can to substantially fill the space unoccupied by the fruit; fifth, seal the filled can under vacuum conditions; and sixth, subject the can and its contents to a sufficient temperature for a period of time sufficient to slightly cook said contents, the fruit being maintained at a temperature below 120° F. from the beginning of the method to and through said fourth step.

3. A continuous method of canning fruit in such manner that it is maintained in substantially fresh condition comprising subjecting the fruit to the following steps in the order named: first, immerse the fruit for a period of about one to two minutes in salt water to prevent oxidation; second, wash the fruit with fresh water for a period of about one to two minutes to remove salt and help open the pores of the fruit; third, place the fruit in a can and subject the same therein to pre-vacuumizing at a high vacuum of about 27 or 28 inches for a time sufficient to withdraw excess moisture from the fruit and open the small pores of the fruit; fourth, introduce simple syrup into the can to substantially fill the space unoccupied by the fruit; fifth, seal the filled can under vacuum conditions; and sixth, subject the can and its contents to a sufficient temperature for a period of time sufficient to slightly cook said contents, all of said steps being performed without any stops.

4. A continuous method of canning fruit in such manner that it is maintained in substantially fresh condition, comprising subjecting the fruit to the following steps in the order stated: first, immersing the fruit for a period of less than five minutes in an approximately five to twenty per cent aqueous salt solution to prevent oxidation; second, washing the fruit in fresh water for a period less than five minutes to remove salt and help open the pores of the fruit; third, placing the fruit in a can and subjecting the same therein to pre-vacuumizing at a high vacuum of about 27 to 28 inches for a time sufficient to open the small pores of the fruit and withdraw excess moisture from the fruit; fourth, introducing simple syrup into the can to substantially fill the open pores and also substantially fill the space unoccupied by the fruit; fifth, sealing the can under vacuum conditions; and sixth, subjecting the can and its contents to a cooking temperature for a period of time sufficient to slightly cook said contents.

5. A continuous method of canning fruit in such manner that it is maintained in substantially fresh condition, comprising subjecting the fruit to the following steps in the order stated: first, immersing the fruit for a period of less than five minutes in an approximately five to twenty per cent aqueous salt solution to prevent oxidation; second, washing the fruit in fresh water for a period less than five minutes to remove salt and help open the pores of the fruit; third, placing the fruit in a can and subjecting the same therein to pre-vacuumizing at a high vacuum of about 27 to 28 inches for a time sufficient to open the small pores of the fruit and withdraw excess moisture from the fruit; fourth, introducing simple syrup into the can to substantially fill the open pores and also substantially fill the space unoccupied by the fruit; fifth, sealing the can under vacuum conditions; sixth, subjecting the can and its contents to a cooking temperature for a period of time sufficient to slightly cook said contents, and finally rapidly cooling the can and its contents.

6. A continuous method of canning apples or the like in such manner that they are maintained in substantially fresh condition comprising peeling, coring and slicing the fruit and then subjecting them to the following steps in the order named: first, immersing the fruit for a period of about one to two minutes in an approximately five to twenty per cent aqueous salt solution to prevent oxidation; second, washing the fruit in fresh water for a period of about one to two minutes to remove salt and help open the pores of the fruit; third, placing the slices in a can and subjecting the same therein to pre-vacuumizing at a high vacuum of about 27 to 28 inches for a time sufficient to open the small pores of the fruit and withdraw excess moisture from fruit; fourth, introducing simple syrup into the can to substantially fill the open pores and to substantially fill the space unoccupied by the fruit; fifth, sealing the can under vacuum conditions; sixth, subjecting the can and its contents to a cooking temperature for a period of time sufficient to cook said contents, and maintaining the fruit at a temperature below 120° F. until the can is sealed.

7. A method of canning apples in such manner that they are maintained in substantially fresh condition comprising peeling and coring the apples and then subjecting them to the following steps without any stops: first, plunging the apples in salt water to prevent oxidation; second, plunging them into warm fresh water thereby removing the salt and opening the pores of the apples; third, placing the apples in a can and subjecting the same therein to pre-vacuumizing at high vacuum for a time sufficient to open the small pores of the apples; fourth, introducing simple syrup into the can to substantially fill the space unoccupied by the apples; fifth, sealing the filled can under vacuum conditions; and sixth, cooking the apples while in the can.

ADOLPH K. MALMQUIST.